(12) United States Patent
Ito et al.

(10) Patent No.: US 8,087,008 B2
(45) Date of Patent: Dec. 27, 2011

(54) WEB LOAD TEST METHOD AND WEB LOAD TEST PROGRAM

(75) Inventors: Masayuki Ito, Yokohama (JP); Tooru Higeta, Yokohama (JP); Koutarou Matsuo, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1313 days.

(21) Appl. No.: 11/512,337

(22) Filed: Aug. 30, 2006

(65) Prior Publication Data
US 2007/0233454 A1    Oct. 4, 2007

(30) Foreign Application Priority Data
Mar. 29, 2006    (JP) .................................. 2006-092484

(51) Int. Cl.
*G06F 9/44*    (2006.01)
*G06F 9/45*    (2006.01)
*G06F 15/173*    (2006.01)

(52) U.S. Cl. ........... 717/135; 717/131; 703/22; 709/224
(58) Field of Classification Search .................... 717/135
See application file for complete search history.

(56) References Cited

U.S. PATENT DOCUMENTS

| | | | |
|---|---|---|---|
| 6,477,483 B1 * | 11/2002 | Scarlat et al. ................. | 702/186 |
| 6,754,701 B1 * | 6/2004 | Kessner .......................... | 709/219 |
| 7,000,224 B1 * | 2/2006 | Osborne et al. ............... | 717/125 |
| 2003/0028828 A1 | 2/2003 | Kakimoto | |
| 2003/0074161 A1 * | 4/2003 | Smocha et al. ............... | 702/186 |
| 2003/0120971 A1 * | 6/2003 | Christie .......................... | 714/25 |
| 2003/0233448 A1 * | 12/2003 | Zhu et al. ....................... | 709/224 |
| 2005/0228621 A1 | 10/2005 | Matsuo et al. | |

FOREIGN PATENT DOCUMENTS

| | | |
|---|---|---|
| JP | 2003-46569 | 2/2003 |
| JP | 2004-021523 | 1/2004 |
| JP | 2005-284418 | 10/2005 |
| JP | 2005-332139 | 12/2005 |

OTHER PUBLICATIONS

Japanese Office Action mailed Nov. 4, 2009 in corresponding Japanese Patent Application 2006-092484.

\* cited by examiner

*Primary Examiner* — James D Rutten
(74) *Attorney, Agent, or Firm* — Fujitsu Patent Center

(57) ABSTRACT

The web load test apparatus includes a virtual web client generation section to generate virtual web clients each of which transmits a request message to a web server and receives a response message according to a scenario; a memory section to store synchronous point that specifies an order in the scenario of the response message, which is a synchronous point among the response messages, into a storage; a waiting section to interrupt the accesses by the clients until a time when all the clients receive the response messages whose orders are indicated by the synchronous point; a resumption section to resume the accesses when all the clients receive the response messages whose orders are indicated by the synchronous point; and a rewrite section to replace the synchronous point stored in the storage with synchronous point that specifies another response message.

7 Claims, 6 Drawing Sheets

WEB LOAD TEST METHOD AND WEB LOAD TEST PROGRAM

BACKGROUND OF THE INVENTION

Figure 1:
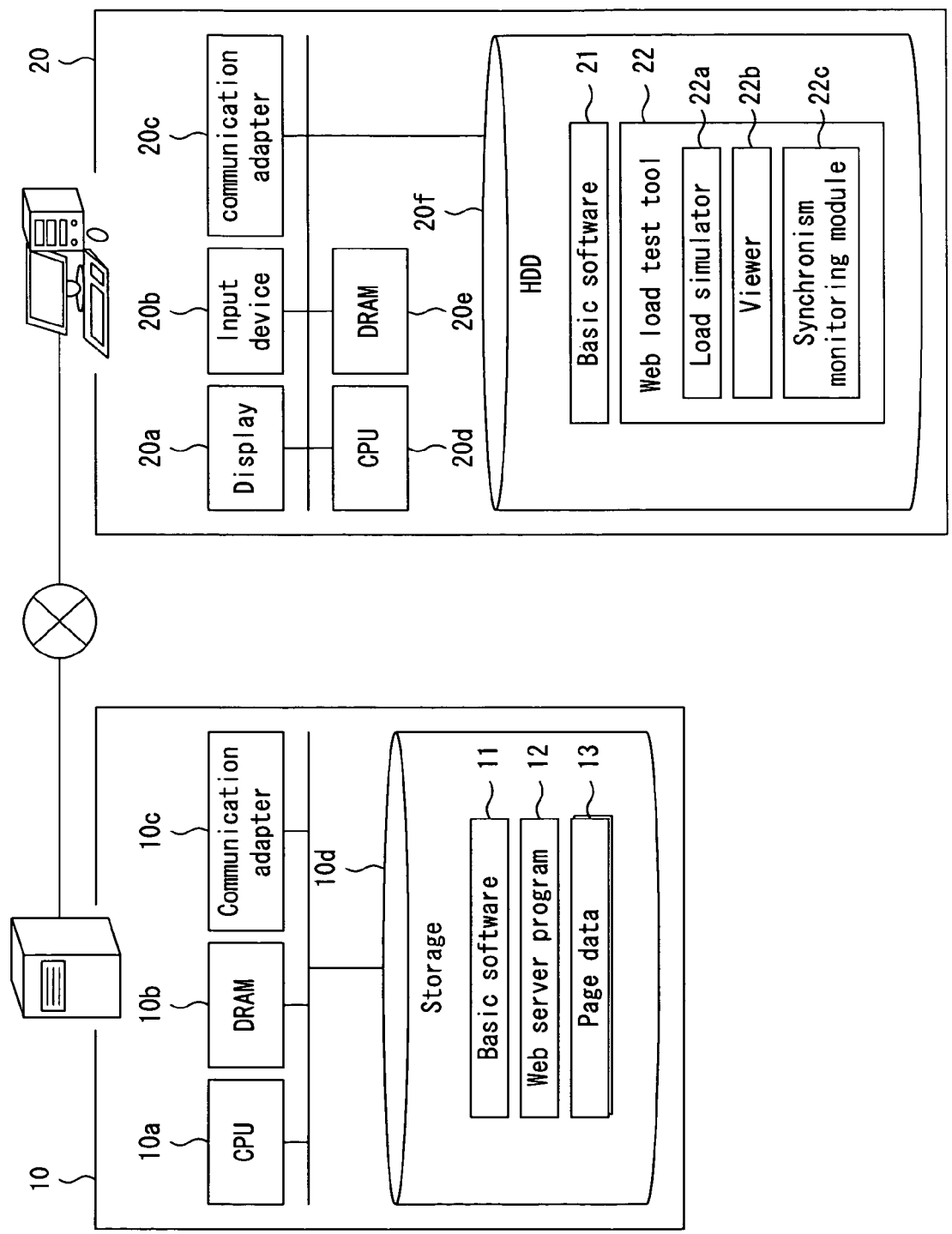

The present invention relates to a web load test method that applies access load to a web server device in order to acquire information about response, and to a web load test program that makes a computer execute such a method.

A web load testing apparatus includes a load simulator and a viewer to observe a state of a web server device as a test target while applying a load thereto. The load simulator generates a plurality of threads that function as virtual web clients; gives scenarios, each of which defines the request order for page data in the web server device as a test target, to the generated virtual web clients; and makes the clients transmit request messages and receive response messages as defined in the scenario. Thereby, the load simulator saves the response messages that are received by the virtual web clients from the web server device, and records logs of the responses. The viewer displays a web page based on the page data in the response messages, or displays a log information list about the responses. In the log information list, each response message is represented by one log information record.

There are some conventional web load testing apparatuses that can control the plurality of threads to fetch a specific page data from the web server device as a test target at the same time.

According to this kind of web load testing apparatuses, a heavy load can be applied to the web server device by fetching the specific page data simultaneously.

Such a web load testing apparatus is disclosed in Japanese unexamined patent publication JP2004-021523A, for example.

However, since the time to apply heavy load must be programmed beforehand in the conventional web load testing apparatuses, it is impossible to apply heavy access load to the web server device at a desired time during the load test.

SUMMARY OF THE INVENTION

The present invention is accomplished to solve the above-mentioned conventional problems, and the object thereof is to provide an improved web load test method, which is capable of applying heavy access load at a desired time during a web load test.

A web load test method of the first aspect according to the present invention acquires information about a response from a web server device as a test target by applying access load to the web server device. The web load test method makes a computer function as virtual web client generation means for generating a plurality of virtual web clients each of which transmits a request message to the web server device as a test target and receives a response message from the web server device in order according to a scenario; memory means for storing synchronous point information that specifies an order in the scenario of the response message, which should be a synchronous point among the response messages obtained according to the scenario, into storage; waiting means for interrupting the accesses by the virtual web clients according to the scenario until the time when all the virtual web clients receive the response messages whose orders are indicated by the synchronous point information in the storage; resumption means for resuming the accesses according to the scenario when all the virtual web clients receive the response messages whose orders are indicated by the synchronous point information in the storage; and rewrite means for replacing the synchronous point information stored in the storage with synchronous point information that specifies another response message.

With this construction, the accesses to the web server device by the virtual web clients are interrupted until all the virtual web clients acquire the response messages whose orders are established as the synchronous point. When all the virtual web clients acquire the response messages whose orders are established as the synchronous point, and accesses are resumed, a heavy load is applied to the web server device. All the virtual web clients are synchronized at the synchronous point stored in the storage. Accordingly, when the order of the synchronous point that is established in the storage is changed to another order, the virtual web clients follow the changed order of the synchronous point. Therefore, the synchronous point can be changed during the load test.

Further, a web load test method of the second aspect of the present invention makes a computer function as load simulator generation means for generating a plurality of load simulators each of which makes a virtual web client execute access to the web server device by transmitting a request message and receiving a response message according to a scenario; memory means for storing synchronous point information that specifies an order in the scenario of the response message, which should be a synchronous point among the response messages obtained by the respective virtual web clients according to the scenario, into storage; waiting means for making the every load simulator interrupt the accesses by the virtual web clients according to the scenario until the time when all the virtual web clients of the load simulator receive the response messages whose orders are indicated by the synchronous point information in the storage; resumption means for making the every load simulator resuming the accesses by the virtual web clients according to the scenario when all the virtual web clients of all the load simulators receive the response messages whose orders are indicated by the synchronous point information in the storage; and rewrite means for replacing the synchronous point information stored in the storage with synchronous point information that specifies another response message.

With this construction, each of the load simulators interrupts the accesses to the web server device by the virtual web clients until all the virtual web clients acquire the response messages whose orders are established as the synchronous point. When all the virtual web clients of all the load simulators acquire the response messages whose orders are established as the synchronous point, and accesses by the respective virtual web clients of the respective load simulators are resumed, a heavy load is applied to the web server device. All the load simulators synchronize the virtual web clients at the synchronous point stored in the storage. Accordingly, when the order of the synchronous point that is established in the storage is changed to another order, the load simulators follow the changed order of the synchronous point. Therefore, the synchronous point can be changed during the load test.

Still further, a web load test program of the first aspect of the present invention is used to acquire information about a response from a web server device as a test target by applying access load to the web server device. The web load test program makes a computer function as virtual web client generation means for generating a plurality of virtual web clients each of which transmits a request message to the web server device as a test target and receives a response message from the web server device in order according to a scenario; memory means for storing synchronous point information that specifies an order in the scenario of the response message, which should be a synchronous point among the response messages obtained according to the scenario, into storage; waiting means for interrupting the accesses by the virtual web clients according to the scenario until the time when all the virtual web clients receive the response messages whose orders are indicated by the synchronous point information in the storage; resumption means for resuming the accesses according to the scenario when all the virtual web clients receive the response messages whose orders are indicated by the synchronous point information in the storage; and rewrite means for replacing the synchronous point information stored in the storage with synchronous point information that specifies another response message.

Therefore, the first aspect of the web load test program can make a computer operate as the device that implements the first aspect of the web load test method of the present invention mentioned above.

Further, a web load test program of the second aspect of the present invention is used to makes a computer function as load simulator generation means for generating a plurality of load simulators each of which makes a virtual web client execute access to the web server device by transmitting a request message and receiving a response message according to a scenario; memory means for storing synchronous point information that specifies an order in the scenario of the response message, which should be a synchronous point among the response messages obtained by the respective virtual web clients according to the scenario, into storage; waiting means for making the every load simulator interrupt the accesses by the virtual web clients according to the scenario until the time when all the virtual web clients of the load simulator receive the response messages whose orders are indicated by the synchronous point information in the storage; resumption means for making the every load simulator resuming the accesses by the virtual web clients according to the scenario when all the virtual web clients of all the load simulators receive the response messages whose orders are indicated by the synchronous point information in the storage; and rewrite means for replacing the synchronous point information stored in the storage with synchronous point information that specifies another response message.

Therefore, the second aspect of the web load test program can make a computer operate as the device that implements the second aspect of the web load test method of the present invention mentioned above.

As described above, according to the present invention, a user can apply heavy access load to a web server device at a desired time during the web load test.

DESCRIPTION OF THE ACCOMPANYING DRAWINGS

Figure 2:
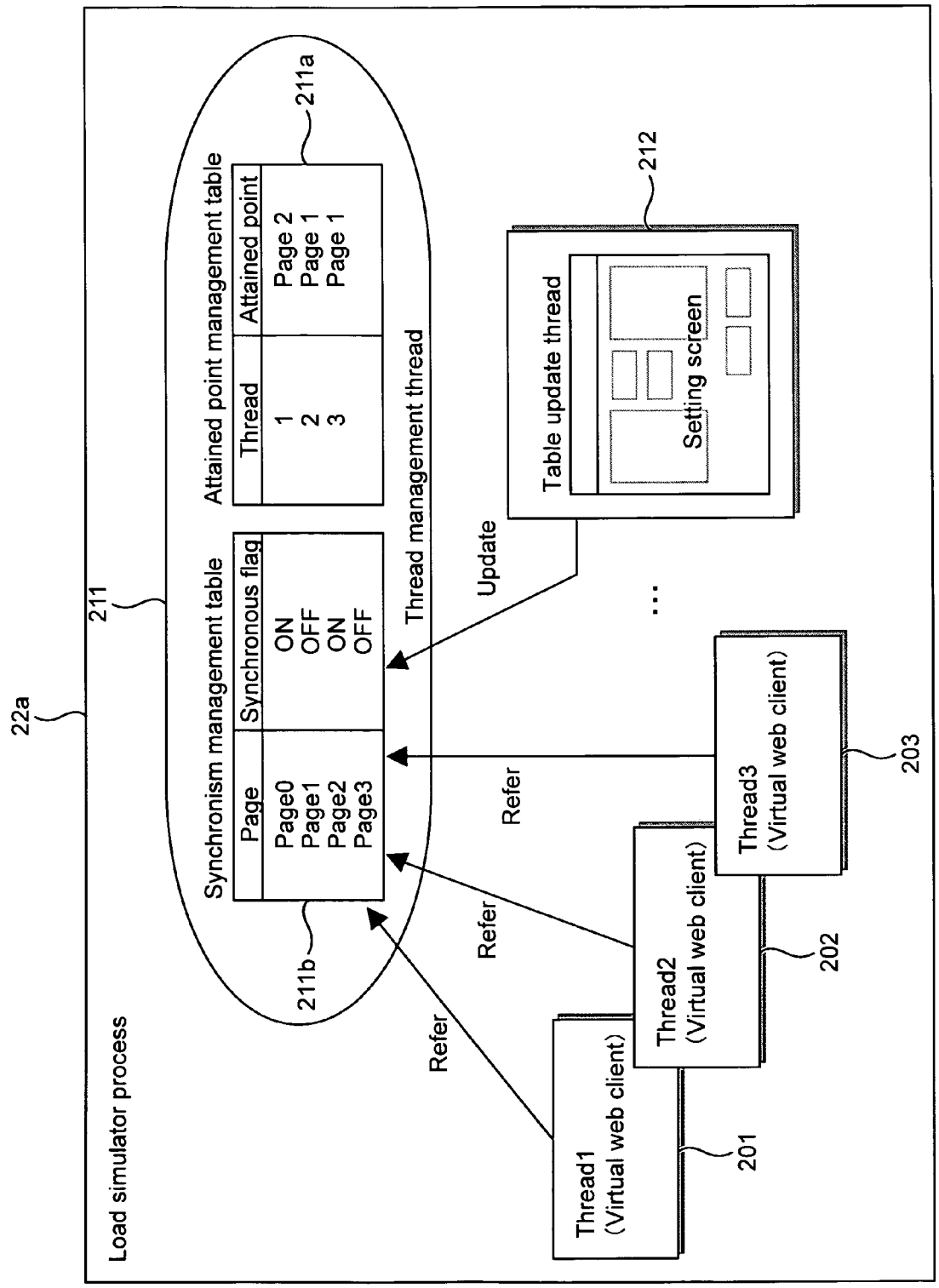
Figure 3:
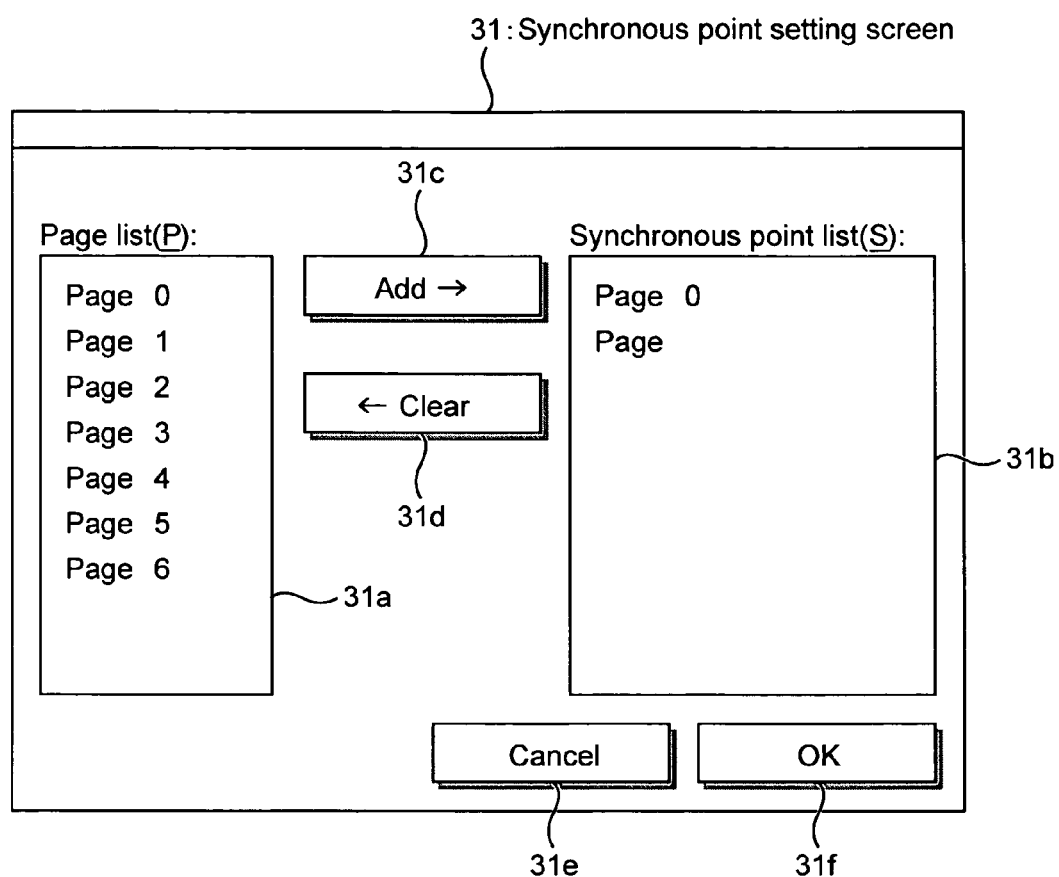
Figure 4:
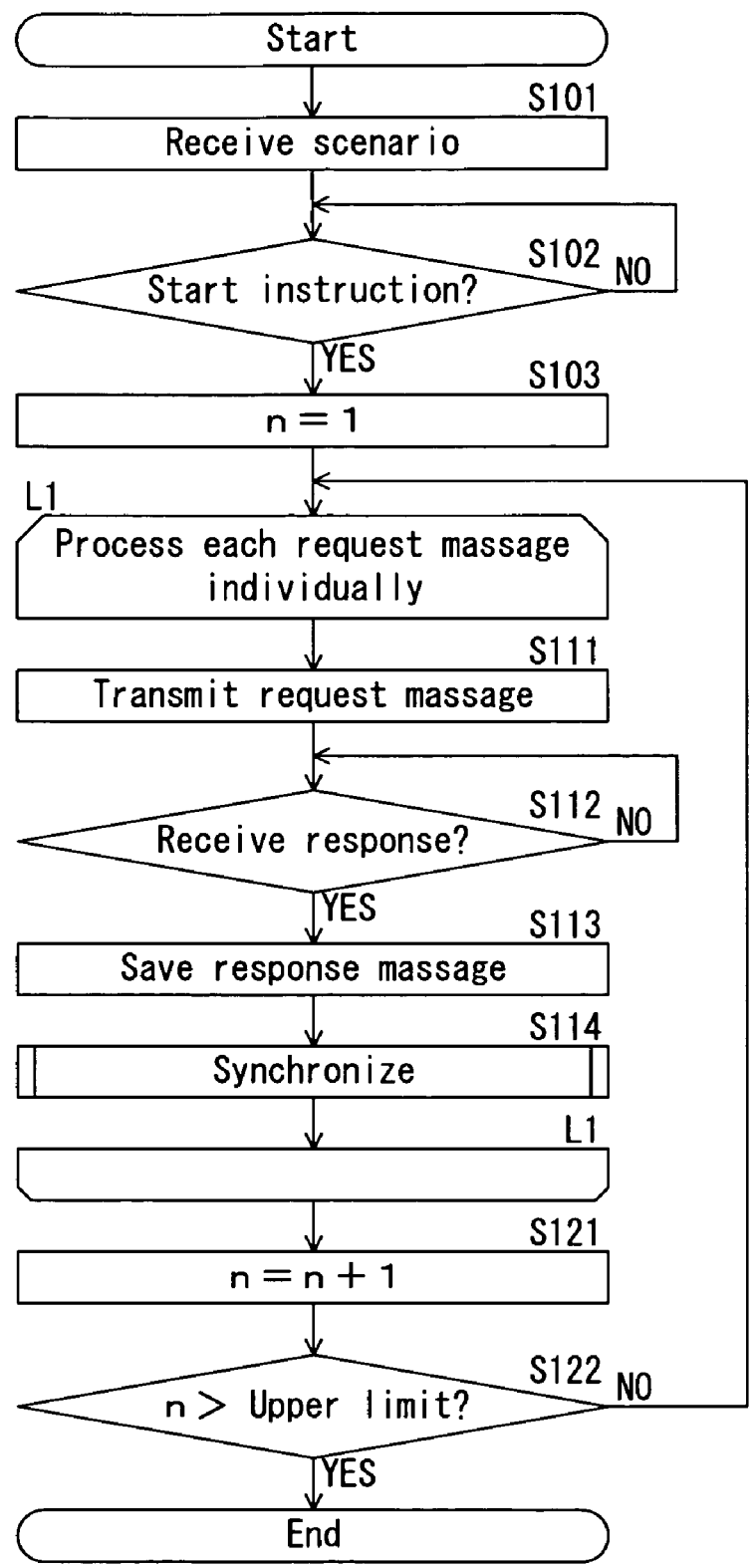
Figure 5:
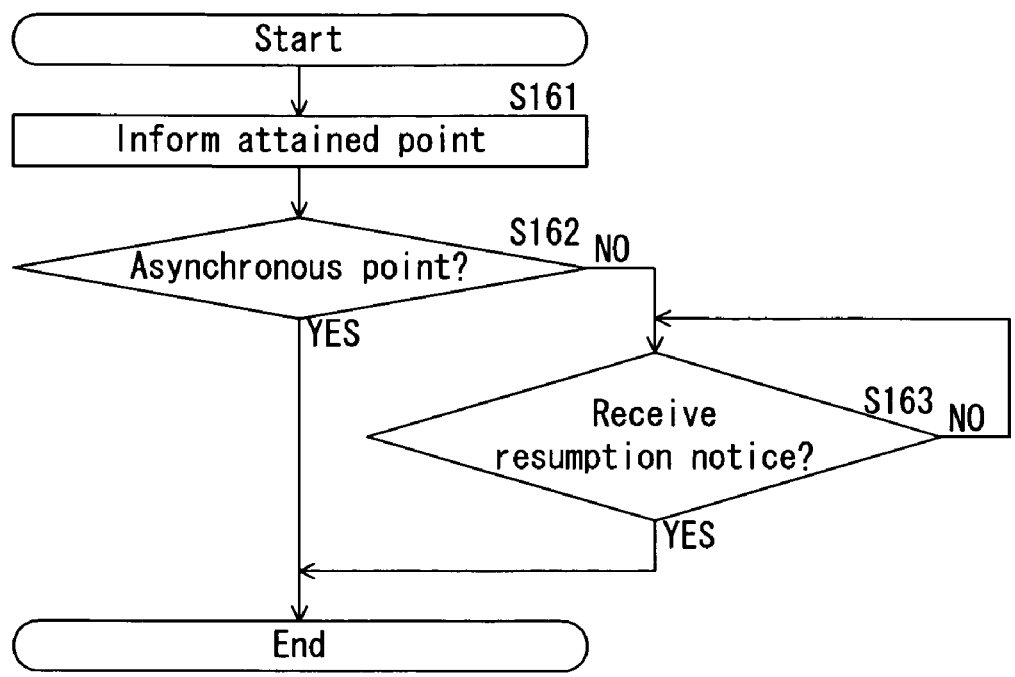
Figure 6:
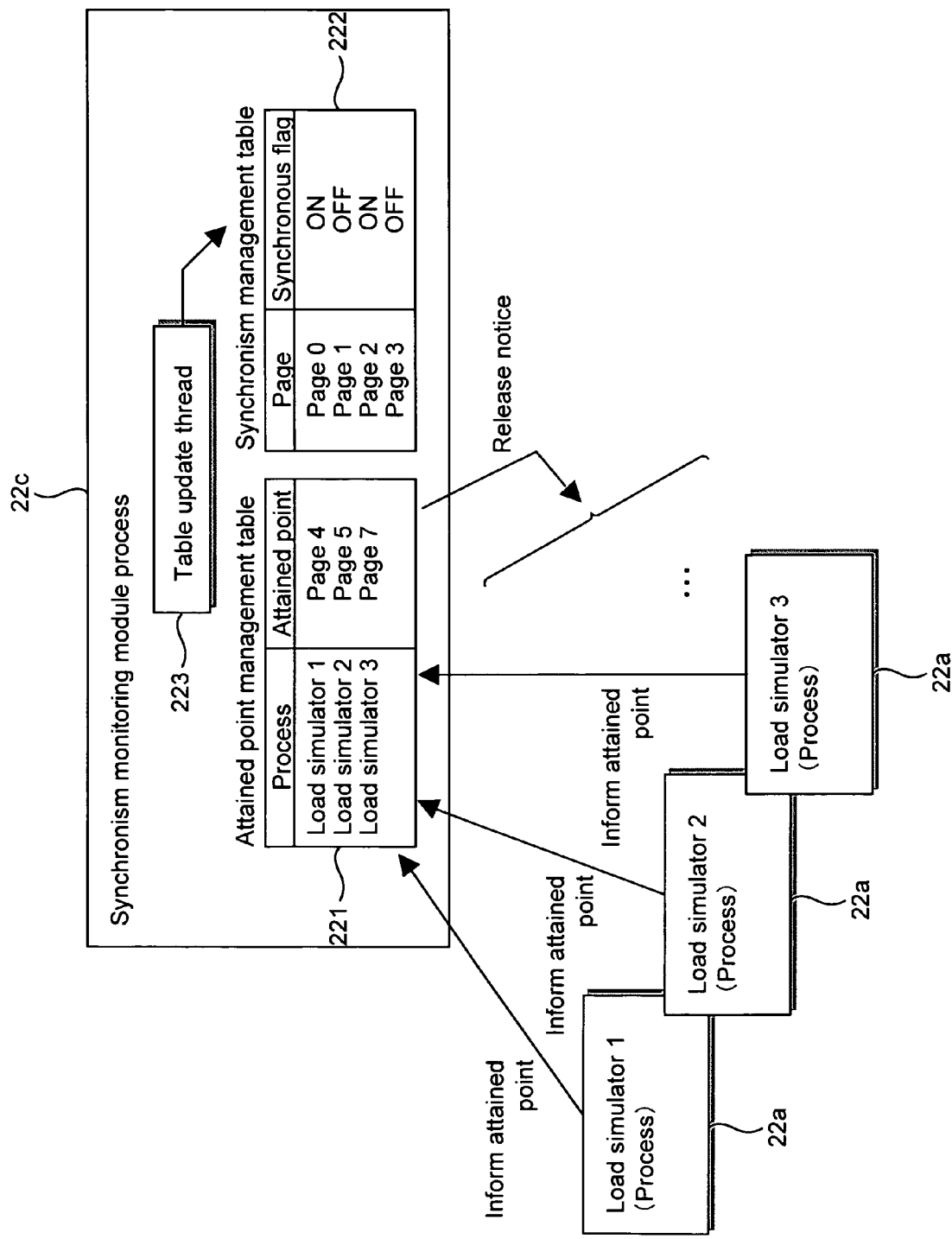

FIG. 1 is a block diagram showing a web server device as a target of the web load test and a web load testing apparatus that executes the test, FIG. 2 shows the function of the load simulator with which the web load testing apparatus of FIG. 1 was equipped, FIG. 3 shows an example of the synchronous point setting screen displayed on a display of the web load testing apparatus of FIG. 1, FIG. 4 is a flow chart showing a process executed by a thread generated as a virtual web client, FIG. 5 is a flow chart showing a process of a synchronous subroutine, and FIG. 6 shows a function of a synchronism monitoring module.

DESCRIPTION OF THE PREFERRED EMBODIMENTS

Hereafter, an embodiment of the present invention will be described with reference to the accompanying drawings.

FIG. 1 is a block diagram showing a web server device 10 that is a target of a web load test and a web load testing apparatus 20 that executes the test according to the embodiment of the present invention.

The web server device 10 is a general purpose computer in which programs for implementing a web server function are installed. The computer that constitutes the web server device 10 contains hardware, such as a CPU (Central Processing Unit) 10a, a DRAM (Dynamic Random Access Memory) 10b, a communication adapter 10c, and storage 10d. The basic software 11, which provides fundamental functions to many pieces of application software, is installed in the storage 10d. For example, the fundamental functions include management of input/output data via the communication adapter 10c, management of memory areas of the DRAM 10b and the storage 10d, and the like.

The storage 10d also stores a web server program 12 and page data 13 that makes a general purpose computer operate as a web server device. Receiving a request from a web client device (not shown), the web server program 12 reads a requested page data from the inner storage or creates a requested page data, and transmits it to the web client device as a source of request through the communication adapter 10c. The page data 13 is HTML (Hyper Text Markup Language) source data for displaying a web page. This page data 13 may include the information that displays a link for jumping to another web page. Further, the page data 13 may include a server side program or a client side program.

The web load testing apparatus 20 is a device for executing a web load test for the web server device 10 of a test target. This web load testing apparatus 20 is a general personal computer in which the program for implementing a web load test tool function has been installed. The personal computer that constitutes the web load testing apparatus 20 is provided with a display 20a such as a liquid crystal display, input devices 20b such as a keyboard and a mouse, and a main unit that is connected to these devices 20a and 20b.

The main unit contains hardware such as a communication adapter 20c, a CPU 20d, a DRAM 20e and storage 20f. The storage 20f stores basic software 21.

The web load testing apparatus 20 stores a web load test tool (program) 22 that makes a personal computer operate as the web load testing apparatus. The web load test tool 22 includes modular programs (components) of a load simulator 22a, a viewer 22b and a scenario generation module 22c.

The load simulator 22a applies access load onto the web server device of a test target. The load simulator 22a is described in detail later. The viewer 22b displays a web page based on the page data in the response message and lists the log information records of the responses.

The web load test tool 22 also includes a synchronism monitoring module 22c. The synchronism monitoring module 22c is also described in detail later.

Next, the function by the load simulator 22a of the embodiment is described in detail.

FIG. 2 shows the function of the load simulator 22a.

As shown in FIG. 2, the load simulator 22a generates a plurality of threads 201, 202, 203 that function as virtual web clients in its inside, gives a scenario, which defines the order of requests to the page data 13 in the web server device as a test target, to each of the virtual web clients, saves the response messages, which are received corresponding to the requests according to the scenario by the virtual web clients 201, 202, 203 from the web server device 10, and records the response log.

Generating the threads 201, 202, 203, the load simulator 22a also generates a thread management thread 211 for managing the synchronous points and proceeding status thereof. The thread management thread 211 has an attained point management table 211a in order to manage the proceeding status of each of the threads 201, 202 and 203. The attained point management table 211a stores records each of which assigns the thread ID (identification), which is uniquely assigned to each thread, to the number of page to which the latest access is completed as the attained point. The number of record is equal to the number of threads. The thread management thread 211 has a synchronism management table 211b in order to manage the synchronous point of each of threads 201, 202, and 203. The synchronism management table 211b stores records each of which assigns the page ID, which is uniquely assigned to each page data used in the load test, to the synchronous flag that indicates whether or not synchronism is necessary in the web page. The number of record is equal to the number of page data.

The load simulator 22a also generates a table update thread 212 for switching the synchronous flag of the synchronism management table 211b that is included in the thread management thread 211.

FIG. 3 shows an example of a synchronous point setting screen 31.

As shown in FIG. 3, the synchronous point setting screen 31 includes a page field 31a, a synchronous point field 31b, an addition button 31c, a clear button 31d, a cancel button 31e and an OK button 31f. The selectable page numbers are listed in the page field 31a. The selectable page numbers of web pages that will be set as synchronous points are indicated in the synchronous point field 31b. A click of the addition button 31c adds the selected page number in the page field 31a to the synchronous point field 31b. The clear button 31d is clicked when a user deletes the page number indicated in the synchronous point field 31b. The cancel button 31e is clicked when a user cancel the setting operation of the synchronous point. The OK button 31f is clicked when the web page whose page number is indicated in the synchronous point field 31b is set as the synchronous point.

When the OK button 31f in the synchronous point setting screen 31 is clicked, the table update thread 212 sets the synchronous flag of the page number, which is indicated in the synchronous point field 31b, in the synchronism management table 211b of the thread management thread 211 as "necessary" (ON) and sets the synchronous flags of the other pages as "unnecessary" (OFF) in order to set the web page whose page number is indicated in the synchronous point field 31b as the synchronous point.

Therefore, the CPU 20d that executes the load simulator 22a corresponds to the virtual web client generation means, the memory means and the rewrite means mentioned above.

Next, the process executed by the threads 201, 202, and 203 that are generated as virtual web clients in the embodiment will be described.

FIG. 4 is a flowchart showing the process that is executed by the thread 201 (202, 203, . . . ) generated as a virtual web client.

In the first step S101, the thread 201 (the CPU 20d that executes the thread) receives a scenario from the load simulator 22a. A scenario consists of some request messages that are transmitted by a virtual web client during the web load test and transmission orders thereof. Every URL (Uniform Resource Locator) in the request messages included in the scenario is assigned to the page data 13 of the web server device 10 used as a test target.

In the next step S102, the thread 201 waits until a start instruction is received from the load simulator 22a. Receiving the start indication of the web load test, the thread 201 proceeds the process to step S103.

In step S103, the thread 201 substitutes an initial value "1" to a variable n that keeps the number of times of use of the scenario. And then, the thread 201 executes a first process loop L1.

In the first process loop L1, the thread 201 executes steps S111 through S114 in order for each of the request messages in the scenario acquired in step S101.

In step S111, the thread 201 transmits a processing target request message.

In the next step S112, the thread 201 waits until receiving a response message as a response from the destination. Receiving a response message, the thread 201 proceeds the process to step S113.

In step S113, the thread 201 adds predetermined attribute information to the received response message and saves them. The attribute information includes, for example, a thread ID, an execution frequency the number of times of execution, a page number corresponding to the request in a scenario, a URL, receipt time.

In the next step S114, the thread 201 executes a synchronism subroutine.

FIG. 5 is a flowchart showing the synchronism subroutine.

In the first step S161 in the synchronism subroutine, the thread 201 informs the page number corresponding to the request message transmitted in step S111 to the thread management thread 211 as attained point information. Receiving the information, the thread management thread 211 increments the value in the "attained point" field of the record corresponding to the thread 201 in the attained point management table 211a by "1".

In the next step S162, the thread 201 determines whether the page number that was informed as the attained point information to the thread management thread 211 is set as a synchronous point or not. Specifically, the thread 201 checks whether the synchronous flag is set or not to the record of the corresponding page number in the synchronism management table 221b included in the thread management thread 211.

When the page number of the attained point is set as the synchronous point, the thread 201 branches the process from step S162 to step S163. In step S163, the thread 201 waits until receiving the resumption notice from the thread management thread 211.

The thread management thread 211 distributes the resumption notices to all the threads 201, 202, 203, . . . , when the values of all the "attained point" fields in the attained point management table 211a are equal to the page number. Receiving the resumption notice, the thread 201 finishes the synchronism subroutine shown in FIG. 5, and finishes the process to the processing target request message.

Therefore, the CPU 20d that executes step S163 as the thread corresponds to the waiting means mentioned above. Further, the CPU 20d, which distributes the resumption notices as the thread management thread when the attained points of all the records in the attained point management table 211a are equal to the synchronous point, corresponds to the resumption means mentioned above.

When the page number of the attained point is not set as the synchronous point in step S162, the thread 201 branches the process from step S162 and finishes the synchronism subroutine shown in FIG. 5 without waiting a resumption notice. The thread 201 also finishes the process to the processing target request message.

After executing step S111 through S114 for all the request messages within the scenario acquired at step S101, the thread 201 leaves the first process loop L1 and proceeds the process to step S121.

In step S121, the thread 201 increments the substituted value of the variable n by "1".

In the next step S122, the thread 201 determines whether the value of variable n goes beyond a predetermined upper limit.

When the value of variable n does not go beyond the predetermined upper limit, the thread 201 branches the process from step S122, and starts to execute the first process loop L1.

On the other hand, when the value of variable n goes beyond the predetermined upper limit, the thread 201 branches the process from step S122, and finishes the process shown in FIG. 4.

Next, the operations and effects of the load simulator 22a of the embodiment will be described.

When a user starts the web load test tool 22 by operating the input device 20b, the web load test starts, which generates a plurality of threads 201, 202, 203, ... that function as virtual web clients. The threads 201, 202, 203 ... apply access load to the web server device 10 according to a predetermined scenario.

During the load test, a user displays the synchronous point setting screen 31 on the display 20a to set the synchronous point on a page to which any threads 201, 202, 203, ... do not attain. Then, the synchronous flag of the page in the synchronism management table 211b is switched to "necessary" (ON). If any of the threads 201, 202, 203, ... attains the page while the threads apply the access load to the web serve device 10, the attained thread waits until the other threads attain the page. When all the threads attain the page, the access load test resumes. This can apply heavy load to the web server device 10 during load test.

Next, the function of the synchronism monitoring module 22c of the embodiment will be described in detail.

FIG. 6 shows functions of the synchronism monitoring module 22c.

As shown in FIG. 6, a plurality of processes that function as the load simulators 22a may be generated depending on the contents of the test. The synchronism monitoring module 22c is a module for monitoring the stages of progress of the load simulators 22a. The CPU 20d that generates a plurality of load simulators 22a corresponds to the load simulator generation means mentioned above.

The synchronism monitoring module 22c has an attained point management table 221 in order to manage the stages of progress of the respective load simulators 22a. The attained point management table 221 stores records each of which assigns the process ID, which is uniquely assigned to each load simulator 22a, to the number of page to which the latest access is completed as the attained point. The number of record is equal to the number of processes. Further, the synchronism monitoring module 22c has a synchronism management table 222 in order to manage the synchronous points of the respective load simulators 22a. The synchronism management table 222 is the same as that shown in FIG. 2. That is, the synchronism management table 222 stores records each of which assigns the page ID, which is uniquely assigned to each page data, to the synchronous flag that indicates whether the synchronization in the web page is necessary or not. The number of record is equal to the number of page data.

During operation of the synchronism monitoring module 22c, the load simulator 22a monitors the synchronism management table 222 in the synchronism monitoring module 22c. If the synchronous flag of any page number is set as "necessary" (ON), the load simulator 22a switches the synchronous flag of the same page number in synchronism management table 211b contained in the thread management thread 211 of itself to "necessary" (ON). The load simulator 22a makes all the thread wait without transmitting the resumption notice even when the inside thread attains the web page of the page number. The load simulator 22a also informs the waiting page number to the synchronism monitoring module 22c.

Receiving the page number from the respective load simulators 22a, the synchronism monitoring module 22c records the received page number on the inside attained point management table 221. When the attained points of all the load simulators 22a are coincident with the synchronous point defined in the synchronism management table 222, the synchronism monitoring module 22c distributes release notices to all the load simulators 22a.

Receiving the release notice from the synchronism monitoring module 22c, each of the load simulators 22a distributes the resumption notice to the respective inside threads.

Therefore, the CPU 20d that executes the synchronism monitoring module 22c corresponds to the memory means, the waiting means and the resumption means mentioned above.

Next, the operation and effect of the synchronism monitoring module 22c of the embodiment will be described.

After a user starts the web load test tool 22 by operating the input device 20b, the user starts the web load test by operating the load simulators 22a and the synchronism monitoring modules 22c. Then, each of the load simulators 22a applies access load to the web server device 10 according to the given scenario.

During the load test, a user displays the synchronous point setting screen (not shown) on the display 20a by means of the table update thread 112 of the synchronism monitoring module 22c, and sets the synchronous point on a page number to which any load simulator 22a does not attain. Then, the synchronous flag of the page number in the synchronism management table 222 is switched to "necessary" (ON). If any of the load simulators 22a attains the web page of the page number while the load simulators apply the access load to the web serve device 10, the attained load simulator waits until the other load simulators attain the web page of the page number. When all the load simulators attain the web page of the page number, the access load test resumes. This can apply heavy load to the web server device 10 during the load test.

Here, the respective load simulators 22 may use different scenarios. Since the synchronous point is specified by the page number in the synchronism management table 211b, the respective load simulators 22a may attain different web pages, even if the load simulators 22a wait at the web page of the same page number.

The CPU 20d, which switches the synchronous flag in the synchronism management table 222 as the table update thread 223, corresponds to the rewrite means mentioned above.

What is claimed is:

1. A web load test method that acquires information about a response from a web server device as a test target by applying access load on the web server device, the method comprising:

generating, by using a processor, a plurality of virtual web clients each of which transmits a request message to the web server device as a test target and receives a response message from the web server device according to a scenario used at a web load test;

storing, by using the processor, orders in the scenario and information indicating necessity of synchronization between or among the plurality of virtual web clients into a storage, wherein the information is associated with at least one order among the orders;

making, by using the processor, in accesses by the plurality of virtual web clients according to the scenario, one or more of the plurality of virtual web clients interrupt the accesses according to the scenario until a time when all the plurality of virtual web clients receive the response message corresponding to the at least one order, wherein each of one or more of the plurality of virtual web clients has received a response message corresponding to the at least one order;

resuming, by using the processor, the accesses according to the scenario when all the plurality of virtual web clients receive the response message corresponding to the at least one order;

rewriting, by using the processor, the information stored in the storage so that an order associated with the information is changed; and storing, by using the processor, into the storage, pages indicating each of the orders in the scenario used at the web load test and synchronization flags associated with each of the pages, wherein the synchronization flags indicate necessity or unnecessity of synchronization regarding each of the pages.

2. A web load test method, comprising:

generating, by using a processor, a plurality of load simulators each of which makes a virtual web client execute access to a web server device by transmitting a request message and receiving a response message according to a scenario used at a web load test;

storing, by using the processor, orders in the scenario and information indicating necessity of synchronization between or among the plurality of virtual web clients of the plurality of load simulators, into a storage, wherein the information is associated with at least one order among the orders;

making, by using the processor, in accesses by the plurality of virtual web clients of all the plurality of load simulators according to the scenario, one or more of the plurality of virtual web clients interrupt the accesses according to the scenario until a time when all the plurality of virtual web clients of all the plurality of load simulators receive the response message corresponding to the at least one order, wherein each of the one or more of the plurality of virtual web clients has received a response message corresponding to the at least one order;

making, by using the processor, all the plurality of load simulators resume the accesses by the plurality of virtual web clients according to the scenario when all the plurality of virtual web clients of all the plurality of load simulators receive the response message corresponding to the at least one order;

rewriting, by using the processor, the information stored in the storage so that an order associated with the information is changed; and storing, by using the processor, into the storage, pages indicating each of the orders in the scenario used at the web load test and synchronization flags associated with each of the pages, wherein the synchronization flags indicate necessity or unnecessity of synchronization regarding each of the pages.

3. A non-transitory computer readable medium storing a web load test program for performing, when executed by a processor, a method for acquiring information about a response from a web server device as a test target by applying access load to the web server device, the method comprising:

generating a plurality of virtual web clients each of which transmits a request message to the web server device as a test target and receives a response message from the web server device according to a scenario used at a web load test;

storing orders in the scenario and information indicating necessity of synchronization between or among the plurality of virtual web clients, into a storage, wherein the information is associated with at least one order among the orders;

making, in accesses by the plurality of virtual web clients according to the scenario, one or more of the plurality of virtual web clients interrupt the accesses according to the scenario until a time when all the plurality of virtual web clients receive the response message corresponding to the at least one order, wherein each of the one or more of the plurality of virtual web clients has received a response message corresponding to the at least one order;

resuming the accesses according to the scenario when all the plurality of virtual web clients receive the response message corresponding to the at least one order;

rewriting the information stored in the storage so that an order associated with the information is changed; and storing, into the storage, pages indicating each of the orders in the scenario used at the web load test and synchronization flags associated with each of the pages, wherein the synchronization flags indicate necessity or unnecessity of synchronization regarding each of the pages.

4. The non-transitory computer readable medium storing the web load test program according to claim 3, wherein the program makes the computer further execute storing attained point information that indicates an order of a latest response message that has been received by each of the plurality of virtual web clients, and determining whether all the plurality of virtual web clients have received the response message corresponding to the at least one order based on the attained point information.

5. A non-transitory computer readable medium storing a web load test program that, when executed by a processor, performs a method comprising:

generating a plurality of load simulators each of which makes a virtual web client execute access to a web server device by transmitting a request message and receiving a response message according to a scenario used at a web load test;

storing orders in the scenario and information indicating necessity of synchronization between or among the plurality of virtual web clients of the plurality of load simulators, into a storage, wherein the information is associated with at least one order among the orders;

making, in accesses by the plurality of virtual web clients of all the plurality of load simulators according to the scenario, one or more of the plurality of virtual web clients interrupt the accesses according to the scenario until a time when all the plurality of virtual web clients of all the plurality of load simulators receive the response message corresponding to the at least one order, wherein each of the one or more of the plurality of virtual web clients has received a response message corresponding to the at least one order;

making the plurality of load simulators resume the accesses by the plurality of virtual web clients according to the scenario when all the plurality of virtual web clients of all the plurality of load simulators receive the response message corresponding to the at least one order;

rewriting the information stored in the storage so that an order associated with the information is changed; and storing, into the storage, pages indicating each of the orders in the scenario used at the web load test and synchronization flags associated with each of the pages, wherein the synchronization flags indicate necessity or unnecessity of synchronization regarding each of the pages.

6. A web load test apparatus that acquires information about a response from a web server device as a test target by applying access load to the web server device, the apparatus comprising:

a storage; and a processor executing processes including generating a plurality of virtual web clients each of which transmits a request message to the web server device as a test target and receives a response message from the web server device according to a scenario used at a web load test;

storing orders in the scenario and information indicating necessity of synchronization between or among the plurality of virtual web clients into the storage, wherein the information is associated with at least one order among the orders;

making, in accesses by the plurality of virtual web clients according to the scenario, one or more of the plurality of virtual web clients interrupt the accesses according to the scenario until a time when all the plurality of virtual web clients receive the response message corresponding to the at least one order, wherein each of the one or more of the plurality of virtual web clients has received a response message corresponding to the at least one order;

resuming the accesses according to the scenario when all the plurality of virtual web clients receive the response message corresponding to the at least one order;

rewriting the information stored in the storage so that an order associated with the information is changed; and storing, into the storage, pages indicating each of the orders in the scenario used at the web load test and synchronization flags associated with each of the pages, wherein the synchronization flags indicate necessity or unnecessity of synchronization regarding each of the pages.

7. A web load test apparatus, comprising:

a storage; and a processor executing processes including generating a plurality of load simulators each of which makes a virtual web client execute access to a web server device by transmitting a request message and receiving a response message according to a scenario used at a web load test;

storing orders in the scenario and information indicating necessity of synchronization between or among the plurality of virtual web clients of the plurality of load simulators, into the storage, wherein the information is associated with at least one order among the orders;

making, in accesses by the plurality of virtual web clients of all the plurality of load simulators according to the scenario, one or more of the plurality of virtual web clients interrupt the accesses according to the scenario until a time when all the plurality of virtual web clients of all the plurality of load simulators receive the response message corresponding to the at least one order, wherein each of the one or more of the plurality of virtual web clients has received a response message corresponding to the at least one order;

making the plurality of load simulators resume the accesses by the virtual web clients according to the scenario when all the plurality of virtual web clients of all the plurality of load simulators receive the response message corresponding to the at least one order;

rewriting the information stored in the storage so that an order associated with the information is changed; and storing, into the storage, pages indicating each of the orders in the scenario used at the web load test and synchronization flags associated with each of the pages, wherein the synchronization flags indicate necessity or unnecessity of synchronization regarding each of the pages.

* * * * *